United States Patent Office
3,189,444
Patented June 15, 1965

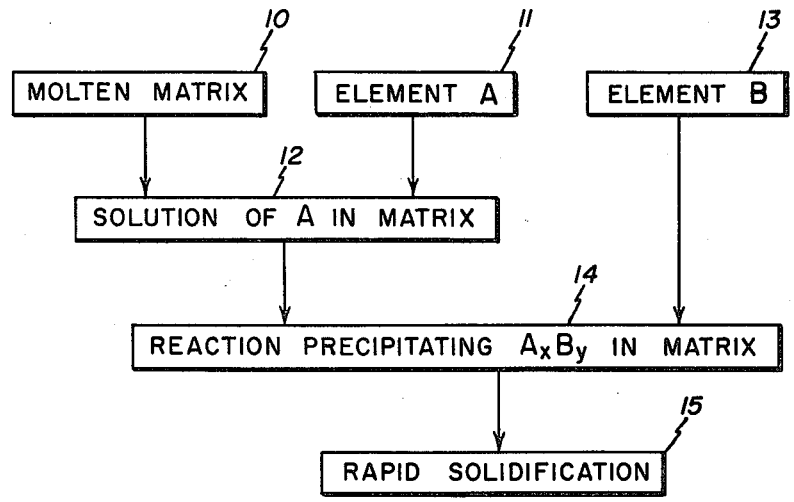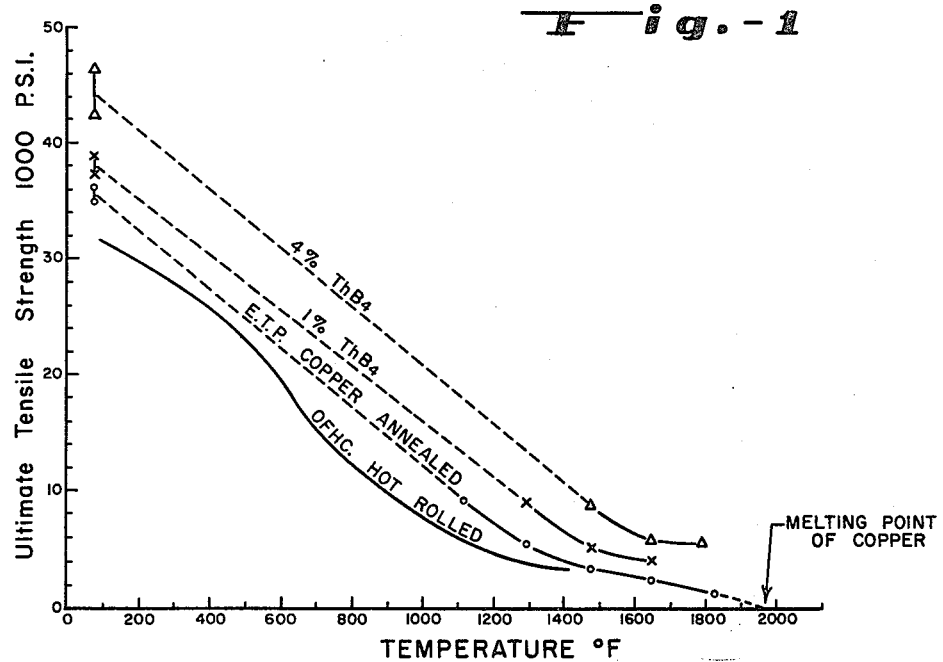

3,189,444
METALLIC COMPOSITION AND METHOD OF MAKING
Leonard E. Olds and Joseph F. Nachman, Denver, Colo., assignors to Colorado Seminary, Denver, Colo., a corporation of Colorado
Filed July 24, 1958, Ser. No. 752,392
16 Claims. (Cl. 75—148)

This invention relates to metallic compositions which are adapted for use under high temperature conditions and particularly to an improved material comprising a metallic matrix and a dispersion of particles of an inert refractory compound providing increased strength of the matrix at high temperatures and to improved methods for producing such material.

Metals and metal alloys are employed in industry for various purposes because of their strength or other characteristic properties. However, these properties commonly deteriorate at high temperatures. For many applications where metals are required to operate under high temperature conditions it is desirable to provide increased tensile strength while maintaining other characteristics of the metal such, for example, as impact strength, ductility and electrical conductivity.

It has been known for some time that the strength of some metals at high temperatures may be increased by incorporating in the base metal or matrix a dispersion of an inert refractory compound such as a ceramic. The principal method which has been employed for effecting the mixing of the metal and the refractory composition involves the mixing of powdered metal and refractory; this involves the so-called powder metallurgy processes. Another method employed heretofore involves the addition of the inert compound in finely-divided form to a molten body of metal. The products of the processes employed heretofore have been satisfactory for some purposes and have provided materials having improved characteristics for certain applications. Considerable difficulty has been encountered, however, in the addition of the inert material to a molten body because of non-wetting and segregation, and in the powder metallurgy process because the refractory substance has tended to agglomerate. Furthermore, the materials produced by these former methods have been quite limited in their application largely because of the embrittlement resulting from the massive particles of ceramic compound. Further, these materials have not been found to be entirely satisfactory for use in metal casting processes. Accordingly, it is an object of the present invention to provide an improved method for producing metallic bodies containing dispersions of inert refractory substances.

It is another object of this invention to provide an improved metal with refractory dispersion which may be employed in the casting of articles made therefrom.

It is another object of this invention to produce an improved material comprising a metallic base and a dispersion of an inert refractory compound which material has improved characteristics at high temperature as compared with those of the base alone.

It is a further object of this invention to provide a thermal and electrical conducting material comprising a metallic base and an addition substance and which, as compared with the base alone, has increased strength at high temperatures with substantially unimpaired conductivities.

Further objects and advantages of the invention will become apparent as the following description proceeds and the features of novelty which characterize the invention will be pointed out with particularity in the claims annexed to and froming a part of this specification.

Briefly, in carrying out the objects of this invention a process which may be termed "melt-saturation" is employed, and in one embodiment thereof a metallic base material is first melted, then there is added to it a significant quantity of a non-metallic substance in an amount not greater than that required to form a saturated solution of the non-metal in the mass of molten base. A sufficient quantity of a second metal is then added to react with all of the non-metal to form an insoluble precipitate of the desired refractory compound which is thus distributed in the form of very fine particles throughout the molten mass. The molten mass is then cooled quickly to solidify it and provide an improved composite material comprising the metallic base having fine particles of the refractory compound distributed substantially uniformly throughout the solid body. In a modification of the method of this invention, the second metal is added to a second mass of molten base and the two melts are poured together so that they mix intimately to provide a fine precipitate throughout the molten mass which is then cooled quickly as in the first method.

The terms "base metal" and "metallic base" as employed here have reference to a metal or metal alloy which constitutes a major portion of the final product.

For a better understanding of this invention reference may be had to the following description taken in connection with the accompanying drawing, in which:

FIG. 1 is a flow sheet illustrating the method of this invention; and

FIG. 2 is a tensile strength vs. temperature curve illustrating the characteristics of one embodiment of the invention.

The steps of the method of this invention are illustrated generally in the flow sheet FIG. 1. The metallic matrix material is melted to provide a molten mass 10 and one of the elements of the desired refractory compound is provided as indicated at 11 and is added to the molten matrix to provide a solution as indicated at 12. This element, designated A, may be either the metal or non-metal element of the refractory compound to be precipitated and may be added either in solid or molten state and, for example, may be a molten solution of the element in the same material as the matrix. The quantity of element A may be any significant amount up to that required to saturate the molten matrix. The element B, indicated at 13, is then added in an amount sufficient to react with all of the element A in the molten solution. The element B, which is either the metal or non-metal element of the refractory, is the non-metal if A is the metal, and vice versa. The element B may be added as a liquid or a solid and may be in a solution of the matrix material. The elements A and B in solution in the matrix then react to form a precipitate of $A_xB_y$ in the matrix as indicated at 14 and the molten mass is then quickly cooled to effect rapid solidification as indicated at 15. The precipitate of the refractory results in the formation of extremely fine particles throughout the matrix and greatly increases the effectiveness of the refractory in strengthening the matrix. It will be understood that steps 10, 12 and 14 may be carried out while the molten matrix remains either in the same crucible or other container, the elements A and B being added in turn to the molten mass.

Rapid solidification is necessary in the method as just described and is employed in order to maintain the particles of the precipitate dispersed throughout the molten mass and for minimizing agglomeration of the precipitate. Agitation or mixing of the molten matrix may be employed during the reaction step in order to facilitate the uniform distribution of the precipitate throughout the molten mass. Rapid solidification may be carried out, for example, in a chill mold into which the molten matrix is poured immediately after or during the reaction of the elements A and B, or the solutions may be shotted or atomized and the resulting solidified particles compacted subsequently into a coherent body. Any effects of the atmosphere on the materials during the steps of the process must be considered and, in order to avoid adverse effects or to secure atmosphere containing an element to be used in the process, it is desirable to provide a controlled atmosphere.

While for purposes of this description the formation of a binary compound is described, it is apparent that the invention applies equally well to the formation of complex refractory compounds in a metallic matrix. Thus either or both the metallic and non-metallic part of the compound may be complex, as for example in the case of a titanium zirconium carbonitride.

One material embodying the invention, by way of illustration, comprises a metallic composition having copper as the base metal in which particles of thorium boride have been formed. This material utilizes the high conductivity of copper together with a substantial increase in the strength of the material over that of copper at high temperatures. Furthermore, thorium boride has a density of the same order as copper which minimizes any tendency of the refractory to separate by gravity when the mixture is in the molten state. In making the material a quantity of copper is first melted by induction heating in a graphite crucible in a controlled atmosphere of argon or other suitable inert gas. In the practice of this invention it was found desirable to employ a gas-tight furnace chamber maintained under a slight positive pressure of the inert gas and provided with manipulating devices for handling the materials from outside the chamber. Boron is then added in the form of a previously prepared copper-boron solution. The melting stock employed in the preparation of this copper-boron solution was a commercial copper and 4% boron alloy; this alloy was of hypereutectic composition with a substantial excess of the massive $CuB_{22}$ phase. Upon melting of the alloy copper boride particles floated and these undissolved particles were eliminated by solidifying the melted alloy and cutting off the upper portion; the lower portion had a boron content which by examination of the microstructure was estimated at 1.8%, this being a quantity of boron slightly below the eutectic point which lies at 2% boron by weight. This low percentage of boron assures that there will not be present in the melt any appreciable quantity of copper boride compound ($CuB_{22}$). If sufficient thorium is added to this 1.8% boron-copper solution to combine with all of the boron there would result a composition containing about 12% thorium borides. By way of example, if the preparation of a copper matrix material containing of the order of 4% or less thorium boride is desired, the master or primary copper-boron solution is made by the addition of the 1.8% boron solution to molten copper to reduce the total percentage of boron sufficiently to produce solutions within the range of, say 1% to 4% thorium boride when sufficient thorium is added to react with all of the boron content, the two elements thus being present in stoichiometric quantities. It has been found desirable to mix the solid copper and solid copper boron solution prior to melting and to melt the two materials together to form the primary melt or initial solution containing a predetermined percentage of boron, less than 1.8%.

After the primary boron-copper solution has been prepared thorium is added by first heating a body of solid copper-thorium alloy to a temperature near its melting point and then plunging the alloy into the molten copper. The quantity of thorium is selected to be sufficient to react with all of the boron in the copper-boron solution to form thorium boride throughout the molten mass, the amount of boron in the primary solution determining the percentage of thorium boride formed in the final molten solution. The molten mass is then cooled quickly in a steel mold inside the inert gas chamber so that the precipitated thorium boride remains distributed throughout the mass when it has solidified. For purposes of illustration, the rate of cooling of one sample of this material one and one-half inches square and five inches long was such that the molten material at 2127° F. when poured into a steel mold was solidified in about one minute.

Samples of material made by the method just described were subjected to X-ray diffraction tests which showed the presence of thorium boride and were also tested as to hardness, tensile strength and ductility. The strength was found to be substantially greater than that of the base copper at high temperatures of the order of 1200–1800° F. Copper base materials containing thorium borides in quantities ranging from 1% to 4% were made by this method and tested, the metallic compositions having the higher percentages of thorium boride being found to have greater tensile strength.

FIG. 2 shows the effect of temperature on the tensile strength of 1% and 4% thorium boride copper compositions as compared with annealed electrolytic tough pitch copper and oxygen free, high conductivity, hot rolled copper. The four curves indicate that the tensile strength of the thorium boride compositions is higher than that of the base copper throughout the range of temperatures from about 100 to 1800° F. and that, while the tensile strength of the pure metals continues to fall off in the upper temperature ranges, the curves for the thorium boride compositions flatten out. The intermediate portions of the thorium boride composition curves and of the electrolytic tough pitch copper curve have been indicated approximately by dotted lines from the test values at 100° F. up to the points at which these materials had a tensile strength of the order of 9000 pounds per square inch. The tensile strength of the thorium boride compositions is substantially higher than that of the matrix copper and at 1800° F. the 4% thorium boride composition had a tensile strength almost four times that of the copper base at the same temperature. The above described form of the "melt-saturation" method of this invention results in the formation in situ of a refractory material finely dispersed throughout the base metal. The resulting product had a relatively low loss of ductility compared with copper with the added advantage of increased tensile strength at high temperatures.

In another modification of the process of this invention using the copper thorium boride composition as an example, two liquid solutions are prepared, the first being the copper and boron solution described above and the second a solution of thorium in copper in a quantity sufficient to react with all of the boron in the first solution. In this modification the thorium may be added to the copper matrix by melting a solid copper-thorium alloy and a solid copper-boron alloy in two separate crucibles. After the two solutions have been prepared, they are poured together into a mixing chamber which may be a funnel for conducting the mixture directly to the chilled mold. The reaction of the boron and thorium occurs upon mixing of the two molten streams of metal producing the dispersion of precipitated thorium boride distributed throughout the mixed molten mass. Alternatively, one solution may be poured directly into the other, the mixture stirred to effect homogeneous precipitation, and then cast into a chill mold. Thus in this modification of the method the step 13 of FIG. 1 comprises the preparation of a solution of thorium in the copper matrix, this being a solution of the element B corresponding to the solution of the element A at 12 in the diagram of FIG. 1 so that when the two solutions are mixed at 14 they provide quantities of the elements A and B in the amounts to effect essentially complete reaction to form the precipitate $A_xB_y$ in the matrix.

Many metals and alloys may be employed in practicing this invention to secure dispersions of refractory substances therein; for example, a titanium oxide precipitate may be formed in copper and a sample of this material made in accordance with this invention and having 1.25% by weight of titanium oxide was found to provide increased strength of the copper at high temperatures. Initial solutions were formed by adding copper oxide to one molten matrix and titanium to a second molten copper matrix, and the resulting solutions mixed together. The reaction of titanium with oxygen is exothermic and in spite of the temperature rise the molten metal became quite viscous indicating the precipitation of fine particles of titanium oxide. Another example is the formation in aluminum of a precipitate of thorium silicide to form a 1.7% by weight dispersion providing increased strength at high temperatures; initial solutions were formed by adding silicon to one molten alumium matrix and thorium to a second molten aluminum matrix and the aluminum-silicon solution was poured into the aluminum-thorium solution. Again an increase in the viscosity of the melt was observed.

From the foregoing it is apparent that the melt saturation method of this invention may be applied to a wide range of metals and refractory materials to secure compositions having greater strength at higher temperatures than the base metals. Although the methods of this invention have been described in connection with specific materials and compositions, further applications and modifications will occur to those skilled in the art. Therefore, it is not desired that the invention be limited to the specific details disclosed and it is intended by the appended claims to cover all methods and materials within the spirit and scope of the invention.

We claim:

1. The method of producing a dispersion of fine thorium boride particles throughout a copper matrix to produce a copper base alloy of high tensile strength which comprises performing in a controlled atmosphere the steps of melting a mass of copper, adding a quantity of one of the elements of thorium boride to form a solution thereof in copper, and thereafter adding a quantity of the other element of thorium boride sufficient to combine with all of the first element in the solution to react therewith and form thorium boride as a precipitate dispersed throughout the mass of copper, and cooling the molten mass rapidly to solidify the copper with the thorium boride dispersion therein.

2. The method of making a copper base alloy of high tensile strength which comprises performing in an inert atmosphere the steps of melting a mass of copper, adding a quantity of solid copper boron alloy to form a copper boron solution, and thereafter adding a quantity of thorium sufficient to combine with all of the boron in the solution to form thorium boride as a precipitate dispersed throughout the mass of copper, and cooling the molten mass rapidly to solidify the copper with the thorium boride dispersion therein.

3. A copper base alloy comprising essentially approximately .08% to 12% of thorium, .015% to 2.1% of boron, and the balance copper plus incidental impurities, substantially all of said boron and said thorium being present in the form of a precipitate of thorium boride particles formed in and dispersed throughout the copper.

4. A copper base alloy comprising essentially approximately 4% by weight of thorium boride and the balance copper plus incidental impurities, said thorium boride being in the form of a dispersion of particles precipitated within the copper.

5. The method of making a copper base alloy of increased tensile strength which comprises performing in a controlled atmosphere the steps of melting a first and a second mass of copper, adding a quantity of copper oxide to the first molten mass to form a solution of oxygen in copper, adding titanium to the second molten mass to form a solution of titanium in copper, mixing the first solution with a quantity of the second solution to provide sufficient titanium to react with substantially all of the oxygen in the first solution to form a precipitate of fine particles of titanium oxide throughout the mass of copper, and cooling the molten mass rapidly to solidify the copper with the fine titanium oxide particles dispersed throughout the solidified mass.

6. The method of making an aluminum base alloy of increased tensile strength which comprises performing in a controlled atmosphere the steps of melting a first and a second mass of aluminum, adding a quantity of silicon to the first molten mass to form a solution of silicon in aluminum, adding thorium to the second molten mass to form a solution of thorium in aluminum, mixing the first solution with a quantity of the second solution to provide sufficient thorium to react with substantially all of the silicon in the first solution to form a precipitate of fine particles of thorium silicide throughout the mass of aluminum, and cooling the molten mass rapidly to solidify the aluminum with the thorium silicide particles dispersed therein.

7. A copper base alloy comprising essentially approximately 1.25% by weight of titanium oxide and the balance copper plus incidental impurities, said titanium oxide being in the form of a dispersion of particles precipitated within the copper.

8. An aluminum base alloy comprising essentially approximately 1.7% by weight of thorium silicide and the balance aluminum plus incidental impurities, said thorium silicide being in the form of a dispersion of particles precipitated within the aluminum.

9. A process for hardening copper alloys comprising the steps of introducing thorium and boron into a mass of liquid copper to produce a molten solution thereof, stirring said molten solution in order to effectuate a reaction between said thorium and boron, precipitating thorium boride particles as a product of said reaction, dispersing said precipitated particles throughout said liquid copper in a uniform manner, cooling said liquid copper to a solid state in order to retain said precipitated particles in a uniform dispersed manner.

10. A process in accordance with claim 9 wherein said thorium and boron are introduced in stoichiometric quantities such that said solid copper contains from about 1 percent to 4 percent precipitated thorium boride particles.

11. An improved copper alloy having superior tensile strength properties and high thermal and electrical conductivity characteristics consisting essentially of from about 1 percent to 4 percent thorium boride particles uniformly dispersed throughout said alloy with the balance of said alloy being substantially all copper.

12. An improved copper alloy having superior tensile strength properties and high thermal and electrical conductivity characteristics consisting essentially of about 1 percent thorium boride particles uniformly dispersed throughout said alloy with the balance of said alloy being substantially all copper.

13. An improved copper alloy having superior tensile strength properties and high thermal and electrical conductivity characteristics consisting essentially of about 2 percent thorium boride particles uniformly dispersed throughout said alloy with the balance of said alloy being substantially all copper.

14. An improved copper alloy having superior tensile strength properties and high thermal and electrical conductivity characteristics consisting essentially of about 4 percent thorium boride particles uniformly dispersed throughout said alloy with the balance of said alloy being substantially all copper.

15. The method of making a copper base alloy of increased tensile strength which comprises performing in a controlled atmosphere the steps of melting a first and a second mass of copper, adding a quantity of one of the elements of thorium boride to the first mass to form a solution thereof in copper, adding a quantity of the other element of thorium boride to the second mass to form a solution thereof in copper, mixing the first solution with a quantity of the second solution to provide sufficient of said other element in the second solution to react with substantially all of said one element in the first solution to form a precipitate of fine particles of thorium boride throughout the mass of copper, and cooling the molten mass rapidly to solidify the copper with the fine thorium boride particles dispersed throughout the solidified mass.

16. The method of making a copper base alloy of increased tensile strength which comprises performing in a controlled atmosphere the steps of melting a first and a second mass of copper, adding a quantity of boron to the first molten mass to form a solution of boron in copper, adding thorium to the second molten mass to form a solution of thorium in copper, mixing the first solution with a quantity of the second solution to provide sufficient thorium to react with substantially all the boron in the first solution to form a precipitate of fine particles of thorium boride throughout the mass of copper, and cooling the molten mass rapidly to solidify the copper with the fine thorium boride particles dispersed throughout the solidified mass.

References Cited by the Examiner

UNITED STATES PATENTS

| | | | |
|---|---|---|---|
| 570,014 | 10/96 | Hall | 75—153 |
| 660,846 | 10/00 | Ehrensberger | 75—135 X |
| 1,306,070 | 6/19 | McKnight | 75—122.5 |
| 1,570,893 | 1/26 | Hobbs | 75—148 X |
| 1,658,186 | 2/28 | Corson | 75—153 X |
| 1,727,180 | 9/29 | Saklatwalla | 75—135 X |
| 1,911,078 | 5/33 | Keller et al. | 75—147 |
| 2,025,662 | 12/35 | Hensel et al. | 75—153 |
| 2,056,604 | 10/36 | Guertler | 75—122.5 |
| 2,086,604 | 7/37 | Comstock | 75—153 X |
| 2,123,629 | 7/38 | Hensel et al. | 75—153 |
| 2,136,548 | 11/38 | Hensel et al. | 75—153 |
| 2,254,170 | 8/41 | Dillon | 75—122.5 |
| 2,482,423 | 9/49 | Malcolm | 75—164 |
| 2,580,171 | 12/51 | Hagglund | 75—171 |
| 2,616,800 | 11/52 | Wartman | 75—164 |
| 2,793,949 | 5/57 | Imich | 75—138 X |
| 2,852,367 | 9/58 | Goetzel et al. | |
| 3,054,671 | 9/62 | London et al. | 75—153 |

OTHER REFERENCES

Doan: Principles of Physical Metallurgy, 3rd ed., 1953, pages 4–6, published by McGraw-Hill Book Co., Inc., New York, New York.

Hackh's Chemical Dictionary, 3rd ed., 1944, page 139, published by the Blakiston Co., Philadelphia, Pa.

Henderson: Metallurgical Dictionary, 1953, page 40, published by Reinhold Publishing Co., New York, New York.

Metals Handbook, 1948 ed., pages 1246 and 1256, published by American Society for Metals, Cleveland, Ohio.

Rogers: The Nature of Metals, 1951, pages 4–5, published by American Society for Metals, Cleveland, Ohio.

DAVID L. RECK, *Primary Examiner.*

ROGER L. CAMPBELL, RAY K. WINDHAM, MARCUS U. LYONS, *Examiners.*